United States Patent [19]

Okuzumi

[11] 3,816,377

[45] June 11, 1974

[54] SOLID STATE POLYMERIZATION PROCESS

[75] Inventor: Yuzi Okuzumi, Akron, Ohio

[73] Assignee: The Goodyear Tire & Rubber Company, Akron, Ohio

[22] Filed: Sept. 21, 1972

[21] Appl. No.: 290,930

Related U.S. Application Data

[63] Continuation-in-part of Ser. No. 862,444, Sept. 30, 1969, abandoned.

[52] U.S. Cl. ............................ 260/75 M, 260/75 T
[51] Int. Cl. ............................................. C08g 17/003
[58] Field of Search ..................... 260/75 M, 75 T

[56] References Cited
UNITED STATES PATENTS

| | | | |
|---|---|---|---|
| 3,075,952 | 1/1963 | Coover et al. | 260/75 |
| 3,117,950 | 1/1964 | Kibler et al. | 260/75 |
| 3,405,098 | 10/1968 | Heighton et al. | 260/75 |
| 3,544,523 | 12/1970 | Maxion | 260/75 |

FOREIGN PATENTS OR APPLICATIONS

| | | |
|---|---|---|
| 6,709,077 | 1/1968 | Netherlands |
| 1,438,079 | 3/1966 | France |
| 1,446,948 | 6/1966 | France |

*Primary Examiner*—Melvin Goldstein
*Attorney, Agent, or Firm*—F. W. Brunner; J. M. Wallace, Jr.

[57] ABSTRACT

Linear condensation polyester resins are treated with a compound selected from metal salts of phosphorous acids, organophosphorus compounds, and phenolic compounds under solid state polymerization conditions to prevent sticking of the resin to itself or the equipment during solid state polymerization.

6 Claims, No Drawings

SOLID STATE POLYMERIZATION PROCESS

This application is a continuation in-part of application Ser. No. 862,444, filed Sept. 30, 1969 and now abandoned.

This invention relates to the process for treating linear condensation polyester resins. More specifically this invention relates to the process of treating or coating linear condensation polyester resins to prevent their sticking during solid state polymerization.

Generally linear condensation polyester resins after preparation are diced, resulting in the formation of chips of resin. These resin chips have a property of adherability on the outer surfaces when heated. When these resin chaps are polymerized under solid state conditions they agglomerate and form balls and stacks of chips and stick to the reactor walls, thus causing further problems associated with processing of the resin due to the size of the agglomerates.

It is an object of this invention to provide a method of treating linear condensation polyester resins to prevent sticking. It is also an object to provide a method whereby linear condensation polyester resin can be solid state polymerized to high intrinsic viscosities without the processing disadvantages caused by sticking.

In accordance with the invention linear condensation polyester resins having an intrinsic viscosity of at least 0.3 are treated with a compound selected from the group consisting of a metallic salt of phosphorous acids, a metallic salt of phosphoric acids, organophosphorus compounds, and phenolic compounds. The thus treated linear condensation polyester can then be polymerized to higher intrinsic viscosities under solid state conditions without sticking of the resin chips.

The treatment of the polyester resin can be carried out by quenching the polyester melt polymer from the polymerization vessel with an aqueous solution containing about 0.5 percent to about 20 percent by weight of a compound selected from the group consisting of a metallic salt of phosphorous acids and a metallic salt of phosphoric acids and then drying at above 100° C.

The treatment of the polyester resin can also be carried out by contacting the solid polyester resin chips with a solid compound selected from the group consisting of metallic salts of phosphorous acids, metallic salts of phosphoric acids, organophosphorus compounds and phenolic compounds. The resin can be contacted before or during solid state polymerization, for example in a tumbler or mixer, until the desired intrinsic viscosity is attained. Usually under solid state polymerization the intrinsic viscosities attained are above 0.6.

The solid state reaction conditions are well known in the art. The temperature can be from about 180° C. to about 250° C. under reduced pressure, or at atmospheric or superatmospheric pressure. At superatmospheric and atmospheric pressures a flow of inert gas is used to remove volatile materials, while at reduced pressures inert gas is not required, although it can be used, if desired.

The invention is illustrated by the examples that follow.

EXAMPLE 1

50 pounds of polyethylene terephthalate with an intrinsic viscosity of 0.6 measured in a 60/40 phenol-tetrachloroethane mixed solvent at 30° C. in the form of chips were charged into a 3 cubic foot insulated Stockes High Temperature Blender-Dryer. After 30 hours of rotation by the dryer at temperatures of 240° to 245° C. under a pressure of 0.2 millimeter of mercury the chips were discharged with an intrinsic viscosity of 0.94. The inside of the dryer had a buildup of chips at the walls of one cube thickness. In addition, many chips were stuck together, forming stacks and balls.

EXAMPLE 2

The same procedure as followed in Example 1 was followed except that 0.5 pound of diphenyl phenyl phosphonate in solid form was added to the dryer with the polyethylene terephthalate chips. After 30 hours the chips were discharged with an intrinsic viscosity of 0.95. There were no chips adhering to the inside surfaces of the dryer. There were no stacks or balls of chips. The chips were not stuck together.

EXAMPLE 3

The procedure of Example 1 was followed except that 0.5 weight percent of dioctadecyl hydrogen phosphonate (based on the polyester resin chips) was added to the dryer with the polyethylene terephthalate chips. After 30 hours the chips were discharged with an intrinsic viscosity of 0.95. There were no chips adhering to the inside surfaces of the dryer. There were no stacks or balls of chips. The chips were not stuck together.

EXAMPLE 4

The same procedure as in Example 1 was followed except that 0.25 pound of stannous phosphate was charged into the dryer with the chips. There was no sticking together of the chips nor any chips sticking to the inside surfaces of the dryer.

EXAMPLE 5

The same procedure as in Example 1 was followed except that solid state polymerization was carried out in the presence of 0.5 weight percent of tetrakis[-methylene 3-(3', 5'-ditertiary butyl-4'-hydroxyphenyl propionate)] methane. After 30 hours the polymer chips attained an intrinsic viscosity of 0.983. The chips neither stuck to themselves nor to the walls of the vessel.

EXAMPLE 6

Polyethylene terephthalate in molten form was discharged from the reactor with an intrinsic viscosity of 0.6 measured in a 60/40 phenol tetrachlorethane mixed solvent at 30° C. onto a moving belt which passes through an aqueous solution of 1 percent by weight of trisodium phosphate as a quench. The quenched polymer was diced and the chips placed in a three cubic foot insulated Stockes High Temperature Blender-Dryer and subjected to solid state polymerization at 480° F. at a reduced pressure of 0.3 millimeter of mercury for 30 hours. The chips were discharged at an intrinsic viscosity of 0.94. The chips did not adhere together nor were there any chips adhering to the inside surfaces of the dryer.

The linear condensation polyester resin chips herein referred to include resin that has been prepared by reaction of a free dicarboxylic acid with glycols of the series $HO-(CH_2)_nOH$, where $n$ is an integer from 2 to 10 or an ester forming derivative thereof.

The amount of the compound selected from the group consisting of metallic salts of phosphorous acids, metallic salts of phosphoric acid, organophosphorus compounds and phenolic compounds is in the range of from about 0.01 percent to about 5.0 percent by weight based on the polyester resin chips. The preferred amount is from about 0.10 percent to about 2 percent by weight based on the polyester resin chips. When the treatment of the chips is by quenching the quench solution is composed of an aqueous solution of from about 0.5 percent to about 20 percent by weight of a compound selected from the group consisting of a metallic salt of phosphorous acids and a metallic salt of phosphoric acids and sufficient quench solution is used to quench the melt polymer from the polymerization vessel.

Intrinsic viscosity as recorded for the solid state resins is defined as limit $\ln (\eta_r)/C$ as C approaches 0 in which $\eta_r$ is the viscosity of a dilute solution of the resin in a 50/50 trifluoroacetic acid/dichloromethane solvent mixture divided by the viscosity of the solvent mixture in the same units at the same temperature. The solvent for the polymer before solid state polymerization is 60/40 phenol/tetrachloroethane. For the intrinsic viscosities reported in this specification a sufficient sample of each resin was dissolved in the solvent mixture to form a solution having a resin concentration of approximately 0.4 gram per 100 cubic centimeters of solution. The time of flow of each solution and of the solvent was measured in a No. 1 Ubbelohde Viscometer at 30.0° C. and these times were used in the respective viscosities in the equation above.

The process of this invention has been illustrated particularly with respect to polyethylene terephthalate resin chips. It can also be used to coat polyesters from other acids and other glycols. For example, instead of terephthalic acid, other acids can be used. Representative examples of such acids are P-hydroxyethoxy benzoic acid; 2,6-naphthoic acid; hexahydroterephthalic acid, p,p'-diphenyl dicarboxylic acid, etc.

The invention is applicable to linear glycol terephthalate polyesters and linear copolyesters of terephthalic acid with other dicarboxylic acids and other glycols. Representative examples of such acids are aromatic dicarboxylic acids such as isophthalic acid, orthophthalic acid, and p,p'-diphenyl dicarboxylic acid; cycloaliphatic dicarboxylic acids such as tetrahydroterephthalic acid; and aliphatic dicarboxylic acids such as succinic acid, adipic acid, sebacic acid, etc. The invention can be used to prepare copolyesters such as terephalate copolyesters and particularly copolyesters containing terephthalic acid as a major portion of the total acid component, i.e., those copolyesters containing more than 90 mol percent of terephthalic acid based on the total acid component, the remainder of the acid component being one or more of the acids from the above-mentioned acids or other similar dicarboxylic acid.

The invention is also suitable for ethylene terephthalate-ethylene isophthalate copolyesters containing terephthalic acid as a major portion of the acid component, such as the 90/10 copolyesters.

The invention was illustrated particularly with respect to the use of ethylene glycol. Polyesters of other glycols can also be similarly used. Representative examples of such glycols are the polymethylene glycols having from two to 10 methylene groups such as ethylene glycol, tetramethylene glycol, hexamethylene glycol and decamethylene glycol, the cyclohexane diols, cyclohexane dimethanol, di-β-hydroxyethoxy benzene, and 2,2-bis [4(β-hydroxyethoxy)phenyl] propane and similar varieties of glycols.

The solid state polymerization of polyethylene terephthalate is conveniently carried out by subjecting polyethylene terephthalate resin chips or cubes having from 1/16 to 1/8 inch side dimension and having an intrinsic viscosity of at least 0.3 to a temperature in the range of from about 70° to about 15° C. below the melting temperature of the resin at a pressure of 0.05 millimeter of mercury for a period of time sufficient to increase the intrinsic viscosity usually at least to 0.6 and generally 0.8 or higher as measured in a 50/50 trifluoroacetic acid/dichloromethane mixed solvent at 30° C.

The metallic salts of phosphorous acids and the metallic salts of phosphoric acids of this invention may comprise metals selected from Groups I and IV of the Periodic Table. Representative examples of the metals are Li, K, Na and Sn. Sodium and potassium are particularly desirable metals for these compounds.

Representative examples of the metallic salts of phosphoric acids are trisodium phosphate, disodium phosphate, monosodium phosphate, potassium phosphate and lithium phosphate. Examples of the acids are metaphosphoric acid, triphosphoric acid and orthophosphoric acid.

Representative examples of phosphorous acids are hypophosphorus acid, metaphosphorus acid, orthophosphorus acid and hypophosphoric acid. Representative salts of these acids are the salts of metals of Groups I and IV of the Periodic Table. Li, K, Na and Sn are representative examples.

It is recognized that there is some confusion in the naming of compounds of phosphorus. Different texts that are supposed to be authoritative works use different systems. In order that there be no misunderstanding in regard to the compounds disclosed in this application the system of nomenclature used herein is the system used in Chapter 15, pages 639–651 of Inorganic Chemistry by Moeller published by John Wiley Company 1956.

The organophosphorus compounds of this invention are selected from the group consisting of organophosphite, organophosphonite, organophosphonate and organophosphate.

The organophosphite compounds of the invention are described by the general formula:

$$(RO)_3 P$$

where R is selected from the group consisting of alkyl, aryl, aralkyl and cycloalkyl groups. A representative example of the organophosphite compounds of this invention is 4-hydroxy-3,5-ditertiary butyl phenyl phosphite.

The organophosphonite compounds of this invention are described by the general formula:

$$R - P - (OR)_2$$

where R is selected from the group consisting of alkyl, aryl, aralkyl and cycloalkyl groups. A representative example of the organophosphonite compounds of this invention is di-biphenyl phenyl phosphonite.

The organophosphonate compounds of this invention are described by the general formula:

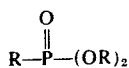

where R is selected from the group consisting of alkyl, aryl, aralkyl and cycloalkyl groups. A representative example of the organophosphonate compounds of this invention is diphenyl phenyl phosphonate. Other examples are diphenyl cyclohexyl phosphonate, dibenzyl phenyl phosphonate and di-biphenyl phenyl phosphonate.

The organophosphate compounds of this invention are described by the general formula:

where R is selected from the group consisting of alkyl, aryl, aralkyl and cycloalkyl groups. A representative example of the organophosphate compounds of this invention is 3′, 5′-ditertiary butyl-4′-hydroxy phenyl phosphate.

In the above general formulae, representative examples of alkyl groups are methyl, ethyl, propyl, butyl, amyl, hexyl, octyl, decyl; representative examples of aryl groups are phenyl, naphthyl, biphenyl; representative examples of aralkyl groups are benzyl, phenpropyl, phenbutyl; representative examples of cycloalkyl groups are cyclopentyl and cyclohexyl.

Representative examples of the phenolic compounds of this invention are tetrakis[methylene-3-(3′,5′-ditertiary butyl-4′-hydroxyphenyl propionate)] methane; octyl-3-(3′,5′-ditertiary butyl-4-hydroxy phenyl) propionate; 2,2′-methylene-bis(4-methyl-6-tertiary butyl phenol); 4,4′-methylene bis(2,6-ditertiary butyl phenol); 2,2′-methylene bis(4-ethyl-tertiary butyl phenol), etc.

While certain representative embodiments and details have been shown for the purpose of illustrating the invention it will be apparent to those skilled in this art that various changes and modifications may be made therein without departing from the spirit or scope of the invention.

What I claim is:

1. In the process of preparing a linear condensation polyester resin selected from the group consisting of polyethylene terephthalate and ethylene terephthalate-ethylene isophthalate copolyesters containing terephthalic acid as a major portion of the acid component of the copolyester by solid state polymerization the improvement which comprises preventing the sticking of polyester chips by treating the polyester resin in the form of chips with from about 0.01 percent to about 5.0 percent by weight based on the polyester resin chips of a compound selected from the group consisting of a salt of a metal selected from Groups I and IV of the Periodic Table and a phosphorous acid selected from the group consisting of hypophosphorous acid, meta phosphorous acid, ortho phosphorous acid and hypophosphoric acid; a salt of a metal of Groups I and IV of the Periodic Table and a phosphoric acid selected from the group consisting of meta phosphoric acid, triphosphoric acid and ortho phosphoric acid; an organophosphorous compound selected from the group consisting of organophosphite compounds of the general formula (RO$)_3$ P; organophosphonite compounds of the general formula R - P - (OR)$_2$ and organophosphonate compounds of the general formula

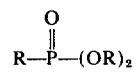

where in said formulas R is selected from the group consisting of alkyl, aryl, aralkyl and cycloalkyl groups; and phenolic compounds selected from the group consisting of tetrakis[methylene-3-(3′,5′-ditertiary butyl-4′-hydroxyphenyl propionate] methane; octyl-3-(3′,5′-ditertiary butyl-4-hydroxy phenyl) propionate; 2,2′-methylene-bis(4-methyl-6-tertiary butyl phenol); 4,4′-methylene bis(2,6-ditertiary butyl phenol) and 2,2′-methylene bis (4-ethyl-tertiary butyl phenol).

2. The process of claim 1 wherein the polyester resin is polyethylene terephthalate.

3. The process of claim 1 wherein the polyester resin in the form of chips is treated with diphenyl phenyl phosphonate.

4. The process of claim 1 wherein the metal of Group I is selected from lithium, sodium and potassium.

5. In the process of preparing a linear condensation polyester resin derived from terephthalic acid and ethylene glycol by solid state polymerization the improvement which comprises preventing the sticking of polyester chips by quenching the polyester melt polymer from the polymerization vessel with of from 0.5 percent to about 20 percent by weight of a compound selected from the group consisting of a salt of a phosphorous acid with a metal of Group I of the Periodic Table of the elements, followed by chipping the quenched polyester and then drying above 100° C.

6. In the process of preparing a linear condensation polyester resin derived from terephthalic acid and ethylene glycol by solid state polymerization the improvement which comprises preventing the sticking of polyester chips by quenching the polyester melt polymer from the polymerization vessel with an aqueous solution of from 0.5 percent to about 2 percent by weight of a compound selected from the group consisting of a salt of a phosphorous acid with a metal of Group IV of the Periodic Table of the elements, followed by chipping the quenched polyester and then drying above 100° C.

* * * * *